(12) United States Patent
Koren et al.

(10) Patent No.: US 11,740,985 B2
(45) Date of Patent: Aug. 29, 2023

(54) HIGH-FREQUENCY EVENT-BASED HARDWARE DIAGNOSTICS

(71) Applicant: MELLANOX TECHNOLOGIES, LTD., Yokneam (IL)

(72) Inventors: Ran Koren, Beijing (CN); Shay Aisman, Zichron Yaakov (IL); Itamar Rabenstein, Petach Tikva (IL); Amir Ancel, Moran (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 247 days.

(21) Appl. No.: 17/241,079

(22) Filed: Apr. 27, 2021

(65) Prior Publication Data
US 2022/0334939 A1    Oct. 20, 2022

(30) Foreign Application Priority Data

Apr. 20, 2021    (CN) .......................... 202110424730.4

(51) Int. Cl.
| | |
|---|---|
| *G06F 11/273* | (2006.01) |
| *G06F 13/20* | (2006.01) |
| *G06F 11/22* | (2006.01) |
| *G06F 11/34* | (2006.01) |
| *G06F 11/30* | (2006.01) |

(52) U.S. Cl.
CPC ........ *G06F 11/273* (2013.01); *G06F 11/2268* (2013.01); *G06F 11/3072* (2013.01); *G06F 11/3075* (2013.01); *G06F 11/3476* (2013.01); *G06F 11/3485* (2013.01); *G06F 13/20* (2013.01); *G06F 11/3013* (2013.01); *G06F 11/348* (2013.01)

(58) Field of Classification Search
CPC .............. G06F 11/273; G06F 11/2268; G06F 11/3072; G06F 11/3075; G06F 11/3476; G06F 11/3485; G06F 13/20; G06F 11/3013; G06F 11/348; G06F 11/3648; G06F 11/2205; G06F 3/0656; G06F 11/2247; G06F 11/26
USPC ........................................................ 370/252
See application file for complete search history.

(56) References Cited

U.S. PATENT DOCUMENTS

| | | |
|---|---|---|
| 7,730,458 B2 | 6/2010 | Isakov et al. |
| 2008/0077835 A1 | 3/2008 | Khoche et al. |

(Continued)

*Primary Examiner* — Kwang B Yao
*Assistant Examiner* — Syed M Bokhari
(74) *Attorney, Agent, or Firm* — KLIGLER & ASSOCIATES PATENT ATTORNEYS LTD (57) ABSTRACT

An apparatus includes operational circuitry and Hardware Diagnostics Circuitry (HDC). The HDC is configured to receive a definition of multiple trigger rules, each trigger rule specifying a respective trigger event as a function of trigger data sources in the operational circuitry, to receive a definition of (i) a pre-trigger logging set selected from among a plurality of diagnostics data sources in the operational circuitry, and (ii) for each trigger rule, a respective post-trigger logging set including a set of one or more of the diagnostics data sources, and, during operation of the operational circuitry, to log the diagnostics data sources in the pre-trigger logging set, to log the trigger data sources and to repeatedly evaluate the trigger rules, and, in response to triggering of a given trigger event by a given trigger rule, to start logging the diagnostics data sources in the post-trigger logging set of the given trigger rule.

20 Claims, 4 Drawing Sheets

(56) References Cited

U.S. PATENT DOCUMENTS

| | | | |
|---|---|---|---|
| 2011/0302212 A1* | 12/2011 | Agrawal | G06F 11/3636 |
| | | | 707/805 |
| 2014/0236662 A1* | 8/2014 | Chen | G06Q 10/0633 |
| | | | 705/7.27 |
| 2020/0341868 A1* | 10/2020 | Carpenter | G06F 11/0709 |
| 2021/0216432 A1* | 7/2021 | Chatterjee | G06F 11/3476 |
| 2022/0052936 A1* | 2/2022 | Chandrasekaran | H04L 43/20 |

* cited by examiner

HIGH-FREQUENCY EVENT-BASED HARDWARE DIAGNOSTICS

FIELD OF THE INVENTION

The present invention relates generally to electronic circuitry, and particularly to in-circuit debug of network devices and other electronic circuits.

BACKGROUND OF THE INVENTION

Complex electronic systems such as network-connected devices often comprise hardware and software that facilitate on-line testing and diagnostics.

U.S. Pat. No. 7,730,458, for example, describes a system and a method facilitating diagnostics support, including applications instrumented in accordance with a built-in diagnostics (BID) framework, and trace components. The trace components can selectively employ none, some and/or substantially all the trace points associated with the application. The system can facilitate instrumentation of a managed data access stack, for example, to enhance supportability of the application.

In another example, U.S. Patent Application Publication 2008/0077835 describes an automatic test equipment capable of receiving diagnostic information from a device under test having a built-in self-test system (BIST) and a diagnostic information collector, which temporarily stores diagnostic patterns output by the BIST and provides a fault indication upon detecting a fault in the device under test. The ATE comprises a device interface connectable to the device under test, a processing system and processing channels. The processing channels are each connected to the device interface and to the processing system and comprise test channels, a fault indication channel and a diagnostic information channel. The test channels are interoperable with the BIST to subject the device under test to a sequence of tests. The fault indication channel is connected to receive the fault indication from the device interface. The diagnostic information channel is operable in response to the fault indication received via the fault indication channel to receive from the device interface at least some of the diagnostic patterns temporarily stored in the device under test as the diagnostic information.

SUMMARY OF THE INVENTION

An embodiment of the present invention that is described herein provides an apparatus including operational circuitry and Hardware Diagnostics Circuitry (HDC). The HDC is configured to receive a definition of multiple trigger rules, wherein each trigger rule specifies triggering of a respective trigger event as a function of one or more trigger data sources in the operational circuitry, to receive a definition of (i) a pre-trigger logging set selected from among a plurality of diagnostics data sources in the operational circuitry, and (ii) for each trigger rule, a respective post-trigger logging set including a respective set of one or more of the diagnostics data sources, and, during operation of the operational circuitry, to repeatedly log the diagnostics data sources in the pre-trigger logging set, to repeatedly log the trigger data sources and to repeatedly evaluate the trigger rules, and, in response to triggering of a given trigger event by a given trigger rule, to start logging the diagnostics data sources in the post-trigger logging set of the given trigger rule.

In some embodiments, at least one post-trigger logging set is different from the pre-trigger logging set. In some embodiments, the HDC is configured to log the diagnostics data sources in the post-trigger logging set over a defined time interval or up to a defined data size. In an example embodiment, the defined time interval or defined data size is specified per trigger rule.

In a disclosed embodiment, the HDC is configured to retain only up to a defined amount of most-recent data from the diagnostics data sources in the pre-trigger logging set. In another embodiment, the HDC is configured to log images of the diagnostics data sources that are time-coherent relative to one another. In yet another embodiment, the HDC is configured to log the diagnostics data sources in a memory and, responsively to a dump command, to output at least part of the logged pre-trigger and post-trigger logging sets.

In a disclosed embodiment, at least one of the trigger rules specifies a condition to be met by the trigger data sources over a defined time interval. In another embodiment, at least one of the trigger rules specifies a statistical condition to be met by the trigger data sources.

In some embodiments, the operational circuitry is configured to process communication packets, and one or more of the trigger rules relate to performance of packet processing by the operational circuitry. In some embodiments, the operational circuitry is configured to communicate over a bus, and one or more of the trigger rules relate to performance of bus communication by the operational circuitry.

There is additionally provided, in accordance with an embodiment of the present invention, a method including receiving, in Hardware Diagnostics Circuitry (HDC) that is coupled to operational circuitry, a definition of multiple trigger rules, wherein each trigger rule specifies triggering of a respective trigger event as a function of one or more trigger data sources in the operational circuitry, and further receiving in the HDC a definition of (i) a pre-trigger logging set selected from among a plurality of diagnostics data sources in the operational circuitry, and (ii) for each trigger rule, a respective post-trigger logging set including a respective set of one or more of the diagnostics data sources. During operation of the operational circuitry, using the HDC, the diagnostics data sources in the pre-trigger logging set is repeatedly logged, the trigger data sources are repeatedly logged, and the trigger rules are repeatedly evaluated. In response to triggering of a given trigger event by a given trigger rule, logging of the diagnostics data sources in the post-trigger logging set of the given trigger rule is started.

The present invention will be more fully understood from the following detailed description of the embodiments thereof, taken together with the drawings in which:

DETAILED DESCRIPTION OF EMBODIMENTS

Overview

Digital systems in general and, particularly, network devices such as network-processors, network interface controllers (NICs), Host-Channel Adapters (HCAs), switches, routers, gateways, and Graphics Processing Units (GPUs), may comprise numerous digital sub-units with complex inter-dependencies. When such a system malfunctions, or if the performance of such a system degrades, locating the root cause may be challenging.

Embodiments according to the present invention that are disclosed herein provide methods and apparatuses that enable efficient high-speed diagnostics of digital systems. In an embodiment, a Hardware Diagnostics Circuitry (HDC) is embedded in the digital system (the part of the digital system to which the HDC is coupled will be referred to as Operational Circuitry).

In an embodiment, the HDC comprises a data-log buffer, a logging multiplexer, and a trigger-evaluation circuit; the HDC is configured to receive i) trigger evaluation rules, ii) pre-trigger logging rules and iii) post-trigger logging rules. The HDC is configured to store in the data-log buffer pre-trigger data from the operation circuitry according to the pre-trigger logging rules, to monitor trigger data sources, and, to detect a trigger condition according to the trigger evaluation rules. After detecting the trigger event, the HDC stores the post-trigger data in the data-log buffer.

According to some embodiments, the HDC is further configured to receive a post-trigger buffer size limit. After a trigger event is detected, the HDC logs post-trigger data up to the post-trigger buffer size, and then stops. In other embodiments, the HDC receives a time-limit for the post-trigger data logging.

In an embodiment, the HDC is configured to send the stored logged data from the data-log buffer to a processor, for analysis and diagnosis.

Lastly, according to embodiment, the HDC comprises a coherent data sampler, which is configured to log coherent images of data in the operational circuitry.

The disclosed techniques provide a powerful and effective monitoring and debugging tool for network devices and other electronic circuits. For example, in some embodiments the HDC supports highly flexible definitions of trigger rules, e.g., rules that specify conditions to be met by the trigger data sources over a defined time interval, and/or statistical conditions to be met by the trigger data sources.

In a typical embodiment, the pre-trigger logging set is common to all possible triggers, whereas the post-trigger logging set is trigger-specific, i.e., may differ from one trigger rule to another. The HDC is thus able to log a wide variety of data sources before occurrence of a trigger, and in this manner cover a broad range of data source across the operational circuitry. After a trigger event has occurred, the trigger-specific definition of the post-trigger logging set enables the HDC to tailor the data sources being logged to the specific nature of each trigger. This feature enables considerable flexibility in defining rule, and also makes efficient use of the limited memory size of the data-log buffer.

System Description

According to embodiments of the present invention, network devices may comprise Hardware Diagnostics Circuits that are programmed by a processor to coherently monitor diagnostics data sources in an operational circuitry, log pre-triggered diagnostics data, evaluate data-dependent trigger events and, if trigger events occur, log data according to the detected trigger event. The HDC may then send the logged data to the processor, for analysis.

Figure 1:
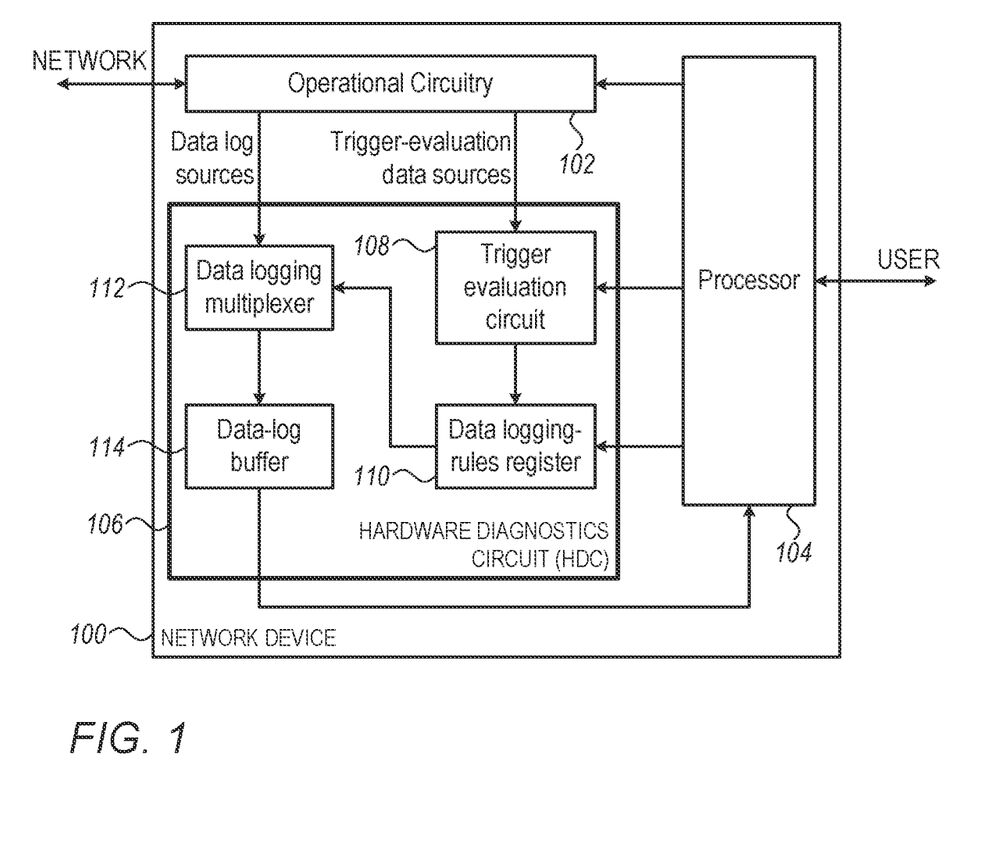
FIG. 1 is a block diagram that schematically illustrates the structure of a network device, in accordance with an embodiment of the present invention.

FIG. 1 is a block diagram that schematically illustrates the structure of a Network Device 100, in accordance with an embodiment of the present invention. in various embodiments, network device 100 may comprise, for example, a network adapter such as a Network Interface Controller (NIC), Host-Channel Adapter (HCA) or Data Processing Unit (DPU—also referred to as "Smart-NIC"), a network processor, a switch, a router, a gateway, a network-enabled Graphics Processing Unit (GPU) or any other suitable type of network device.

The network device comprises Operational Circuitry 102, which is coupled to a network and configured to carry out network-related operations. A user (e.g., a service engineer) may wish to diagnose the operation of the network device by observing nodes within Operational Circuitry 102 (e.g., fill measure of various queues, packet drop count, number of concurrent data flows, to name only a few non-limiting possibilities). The user communicates with the network device through a Processor 104, (in some embodiments processor 104 is a diagnostics-dedicated processor; in other embodiments, processor 104 is a shared processor, e.g., a processor that controls the operational circuitry); in yet other embodiments Processor 104 may comprise a plurality of processors.

To run diagnostics, Processor 104 is configured to write a set of Trigger Evaluation Rules (also referred to herein as "trigger rules") in a Trigger-Evaluation-Circuit 108, and a set of Data-Logging Rules in a Data-Logging-Rules Register 110. Each trigger logging rule specifies triggering of a respective trigger event as a function of one or more trigger data sources in operational circuitry 102.

In an embodiment, the trigger evaluation rules may specify a condition or conditions to be met by the trigger data sources over a defined time interval. In an embodiment, the trigger evaluation rules may comprise complex evaluations, e.g., a trigger event can be triggered when the value of a first monitored data source is greater than a preset minimum, and the value of a second source is between two preset limits (other example of complex trigger evaluation rules will be disclosed below). In the descriptions hereinbelow we will use the terms "detect a trigger event", determine a trigger event" and "trigger a trigger event" interchangeably.

In some embodiments, the operational circuitry is configured to communicate over a bus (a non-limiting example is a Peripheral Component Interconnect Express, or PCIe; other suitable buses may be used in alternative embodiments), and the trigger rules relate to performance of bus communication by the operational circuitry.

In some embodiments Trigger Evaluation Circuit 108 may comprise one or more processors. The trigger-evaluation circuit is configured to receive the trigger evaluation rules from processor 104, monitor the respective trigger evaluation data sources from the operational circuitry, and detect trigger events.

In an embodiment, the data logging rules may comprise a pre-trigger logging set, which defines data sources within the operational circuitry that the HDC should log until a trigger event is detected, and a post-trigger logging set, which defines data sources that the HDC should log after the trigger event is determined. In some embodiments, there may be multiple post-trigger data sources, and the data-logging rules define which data source should be logged after a trigger event is detected, respectively to the trigger event. The pre-trigger logging set is typically not trigger-specific.

HDC 106 further comprises a Data Logging Multiplexer 112, which is configured to select a subset of data log sources in the operational circuitry, responsively to the data logging rules, and a Data-Log Buffer 114, which is configured to store the data that the logging multiplexer selects. In an embodiment, data-log buffer 114 is a First-In-First-Out memory, which is configured to drop the oldest data when new data is stored (in case the buffer is full). In embodiments, post-trigger data logging is limited (e.g., in time); when post-trigger data logging is complete, the processor may issue a Dump command, to read Data-Log Buffer 114, and send the logged data to the user (e.g., using a wave display program).

In summary, according to the example embodiment illustrated in FIG. 1, a user programs the HDC with a set of trigger evaluation rules, a set of pre-trigger data sources ("pre-trigger logging set") and one or more sets of post trigger data sources ("post-trigger logging sets"). The HDC continuously stores the most recent pre-trigger data sources and, concurrently, monitors the trigger data sources and looks for a trigger event (according to the trigger evaluation rules). Once the HDC detects a trigger, the HDC will start logging post-trigger data, which may be determined according to the detected trigger event. The buffer, including pre-trigger and post-trigger data, can be read, and analyzed by the processor (and by the user).

As would be appreciated, the structure of Network Device 100, including HDC 106, illustrated in FIG. 1 and described hereinabove is cited by way of example. In alternative embodiments various suitable structures may be used. For example, in some embodiments, the user may communicate with the HDC through the network and the operational circuitry, rather than through Processor 104. In an embodiment, there is no data-log buffer 114; instead, data is sent via high-speed bus to the processor.

Controlling the Pre and Post Buffer Sizes

In some embodiments, the processor further sends a post-trigger logging duration parameter to the HDC. Once a trigger event is detected, the HDC will fill Data-Log Buffer 114 with post-trigger data samples, for a period equal to the logging duration parameter (also referred to as logging time interval), and then stop. The processor will then read Data-Log Buffer 114, receiving pre-trigger and post-trigger data logs. In embodiments, the post-trigger duration may be replaced by a buffer-fill size; in other embodiments the HDC may be configured to stop the post-trigger data logging when the post-trigger data occupies a preset percentage of the data-log buffer size.

Figure 2A:
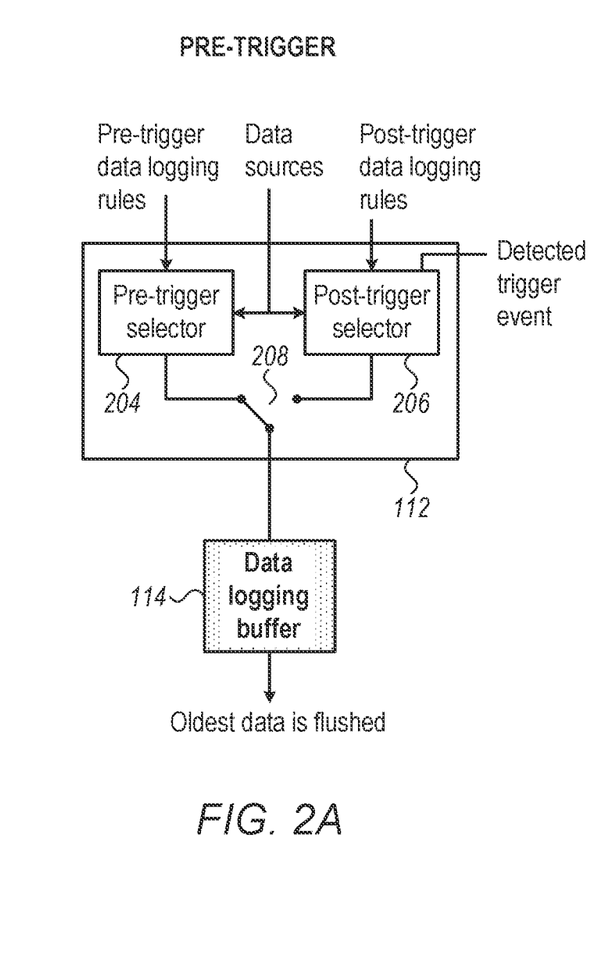
FIG. 2A is a block diagram that schematically illustrates pre-trigger data logging in the network device of FIG. 1, in accordance with an embodiment of the present invention.

FIG. 2A is a block diagram that schematically illustrates pre-trigger data logging, in accordance with an embodiment of the present invention. According to the example embodiment illustrated in FIG. 2A, Data Logging Multiplexer 112, (which was described with reference to FIG. 1) comprises a pre-trigger selector 204, which is configured to select data sources from a group of pre-trigger data sources (of Operational Circuitry 102, FIG. 1) respectively to the pre-trigger data logging rules, and a Post-Trigger Selector 206, which is configured to select data sources respectively to the post-trigger data logging rules and to the selected trigger event.

Data Logging Multiplexer 112 further comprises a Switch 208, which is configured to output pre-trigger data sources from Pre-Trigger Selector 204, or post-trigger data sources from Post-Trigger Selector 206. FIG. 2A schematically illustrates data logging at a time when Trigger Evaluation Circuit 108 (FIG. 1) has not detected any trigger event yet, and Switch 208 outputs pre-trigger data sources, selected by Pre-Trigger Selector 204.

The data output from Data-Logging Multiplexer 112 is output to Data-Log Buffer 114. In embodiments, Data-Log Buffer 114 comprises a First-In-First-Out (FIFO) memory; when the storage capacity of the buffer is exhausted, the oldest data is "flushed" and new data is written instead (in practice, new data overwrites the oldest data). In some embodiments, e.g., when the Data-Log buffer is a segment of a shared memory, the Data Log buffer is configured to store a defined amount of the most-recent data.

Figure 2B:
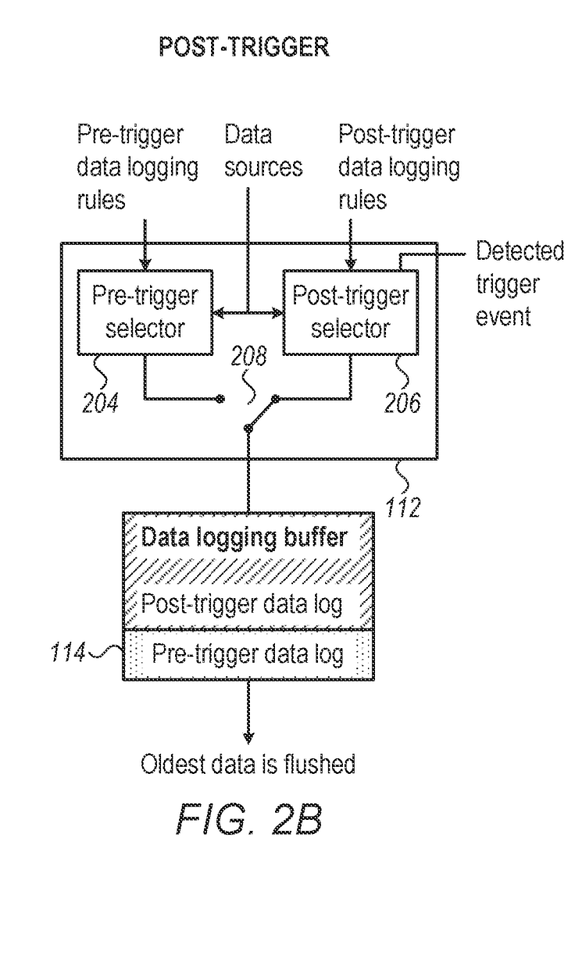
FIG. 2B is a block diagram that schematically illustrates post-trigger data logging in the network device of FIG. 1, in accordance with an embodiment of the present invention.

FIG. 2B is a block diagram that schematically illustrates post-trigger data logging, in accordance with an embodiment of the present invention. FIG. 2B is like FIG. 2A, except that, after Trigger Evaluation Circuit 108 (FIG. 1) detects a trigger event, Switch 208 outputs the post-trigger events that are selected by Post-Trigger Selector 206, respectively to the post-trigger data logging rules, and to the detected trigger event.

Data-Log Buffer 114 now stores post-trigger data, which replaces the oldest pre-trigger data (in addition to some pre-trigger data). In some embodiments, post-trigger data logging will stop after a predefined time interval; in an embodiment, different time intervals may be predefined for different trigger events. In other embodiments, post-trigger data logging stops when the post-trigger data occupies a preset percentage of the buffer size (e.g., 75%).

When post-trigger data logging is complete, processor 104 (FIG. 1) may read the complete or partial contents of Data-Log Buffer 114.

As would be appreciated, the structure of pre and post trigger data logging, illustrated in FIGS. 2A, 2B and described hereinabove, is cited by way of example. In alternative embodiments various suitable structures may be used. For example, in some embodiments Data-Log Buffer 114 is embedded in Processor 104 (FIG. 1); in an embodiment Processor 104 may comprise a dedicated memory for storing the logged data; in another embodiment Processor 104 stores the logging data in a shared memory, e.g., in the processor primary storage. In yet another embodiment, Data-Log Buffer 114 is distributed between HDC 106 and Processor 104.

Coherent Data Sampling

In embodiments, the operational circuit may be complex and comprise numerous inter-dependent data logging sources. To allow coherent analysis, data source logging must be done synchronously for all data sources, to keep the data sources are coherent relative to one another. In the present context, the term "coherent" means that each entry in the data-log buffer pertains to an image of the operational circuitry in which the various logging sources were sampled at the same clock cycle.

In some embodiments, the HDC is configured to correct for delays of interdependent logging sources within the operation circuit. For example, a next entry written to a memory may set a buffer-full flag in the next clock cycle; the HDC may be configured to delay the log of data entries that are written to the buffer by one clock cycle, so that they would coincide with the logging of the buffer-status (including buffer-full) signals.

Figure 3:
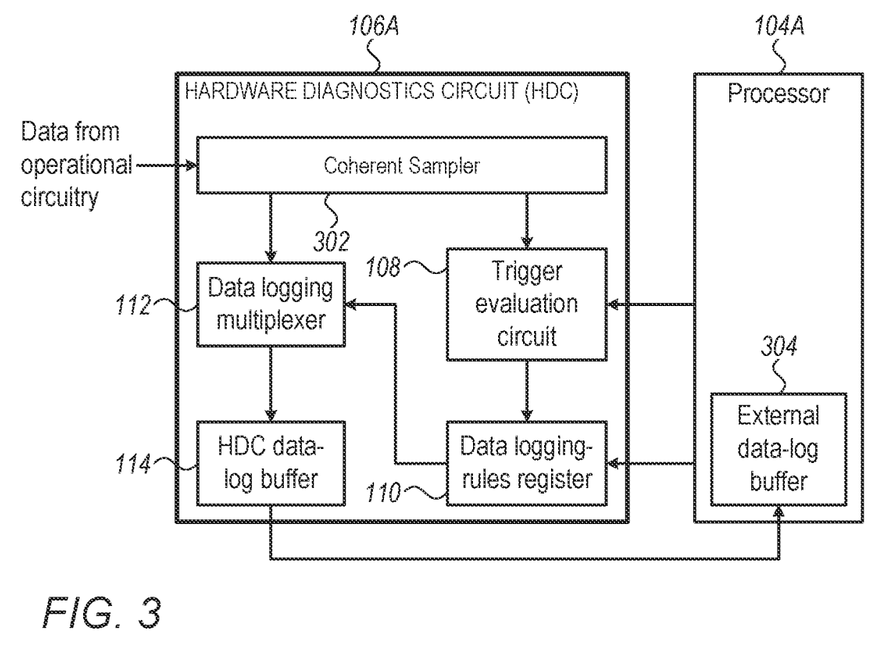
FIG. 3 is a block-diagram of a Hardware Diagnostics Circuit (HDC) in the network device of FIG. 1, in accordance with an embodiment of the present invention.

FIG. 3 is a block-diagram of an HDC 106A, in accordance with an embodiment of the present invention. HDC 106A is similar to HDC 106 (FIG. 1), but comprises, in addition, a Coherent Sampler 302, which is configured to sample coherent images of Operational Circuitry 102 (FIG. 1). Coherent Sampler 302 may comprise delay stages, as well as inter-clock-domain synchronizers.

HDC 102A is coupled to a Processor 104A, which is like Processor 104 (FIG. 1); however, according to the example embodiment illustrated in FIG. 3, Processor 104A comprises an External Data-Log Buffer 304. In embodiments, External Data-Log Buffer 304 is configured to log excess data that the data-log buffer in the HDC cannot store. For example, in an embodiment HDC Data-Log Buffer 114 may comprise 16 Mbyte, whereas External Data-Log Buffer 304 may comprise 256 Mbyte.

Figure 4:
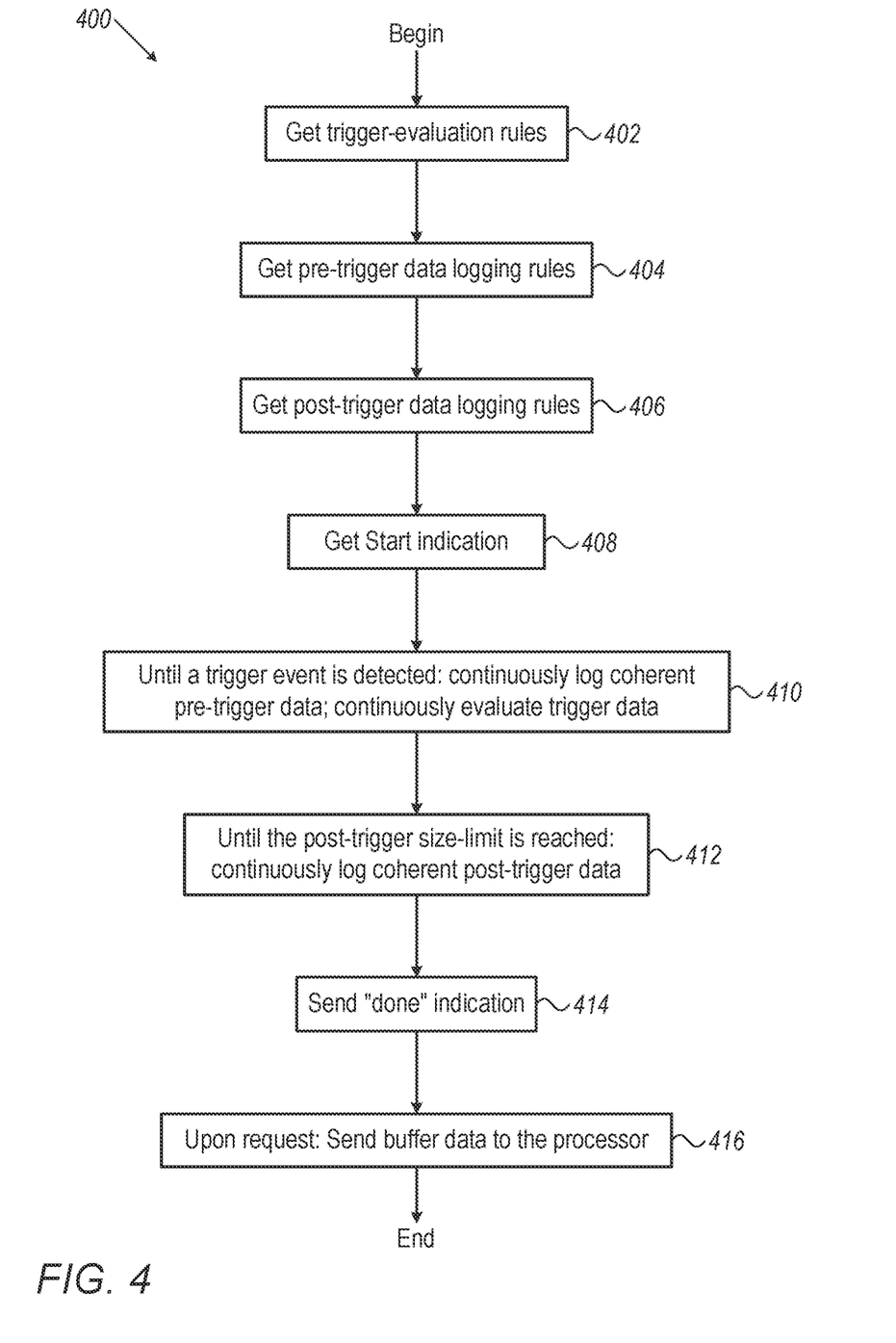
FIG. 4 is a flowchart that schematically illustrates a method for hardware diagnostics, in accordance with an embodiment of the present invention.

FIG. 4 is a flowchart that schematically illustrates a method 400 for hardware diagnostics, in accordance with an embodiment of the present invention. The flowchart is executed by Hardware Diagnostics Circuit 106 (FIG. 1), which communicates with Processor 104 (and, typically, with a user, through the processor).

The flowchart starts at a Get Trigger Evaluation Rules step 402, wherein the HDC receives trigger evaluation rules from a processor (e.g., Processor 104, FIG. 1). As described above (with reference to FIG. 1), the trigger evaluation rules may comprise complex evaluations, including relationship between various data points and calculations carried out on the data.

Next, at a Get Pre-Trigger Logging Rules step 404, the HDC receives from the processor a list of data sources in the operational circuitry (e.g., Operational Circuitry 102, FIG. 1) that the HDC should log prior to a trigger event; and then, in a Get Post-Trigger Logging Rules step 406, the HDC receives from the processor logging rules for data to be logged after a trigger event is detected. In embodiments, the post-trigger rules may comprise lists of data sources to be logged respectively to the detected trigger event.

After step 406, the HDC enters a Get-Start-Indication step 408 and waits for an indication (typically from a user, via a processor) that diagnostics should commence. After receiving a start indication, the HDC enters a Continuous-Pre-Trigger step 410, wherein the HDC repeatedly logs the pre-trigger data according to the pre-trigger data logging rules and, at the same time, repeatedly evaluates the trigger data sources to detect a trigger event.

When, in step 410, the HDC detects a trigger event, the HDC enters a Continuous-Post-Trigger step 412, in which the HDC logs post trigger data, selected according to the post-trigger logging rules and to the detected trigger event. When a preset post-trigger log size had been reached (e.g., 75% of Data-Log Buffer 114 (FIG. 1) stores post-trigger data) the HDC enters a Send-Done step 414 and sends a Done indication to the processor (typically to the user, via the processor). The HDC then enters a Send-Buffer step 416, wherein the HDC, upon receiving a Dump command from the processor, sends the contents of the data-log buffer (or parts thereof) to the processor. After step 416 the flowchart ends.

As would be appreciated, method 400 flowchart illustrated in FIG. 4 and described hereinabove is cited by way of example. Other suitable flowcharts may be used in alternative embodiments. In some embodiments, for example, step 408 is not used, and the HDC starts data logging immediately after receiving the rules. In an embodiment, the HDC sends all data to the processor along with the Done indication. In an embodiment, the HDC receives a new set of rules while sending the logged data corresponding to a previous set of rules, in a pipelined manner.

Use-Case Examples (NIC)

In some embodiments, the diagnostics pertains to packet processing performance of the network device, and the trigger rules relate to performance of packet processing by the operational circuitry.

This section will disclose typical use cases in the performance diagnosis of a Network-Interface Controller (NIC), according to embodiments of the present invention.

In a first example, an unusually high packet-drop rate is observed, and a diagnostics session is initiated. The trigger evaluation rules may be set, for example:

1. To determine a trigger event when the number of dropped packets in a given port and/or in a given receive buffer, during a preset time period, exceeds a preset threshold.
2. To determine a trigger event when the number of dropped packets in a given port and/or in a given receive buffer, during a preset time period, exceeds a preset percentage of the ingress port packet rate.
3. to determine a trigger event when the number of dropped packets in a given port and/or in a given receive buffer, during a preset time period, exceeds the number of packets drops in a previous preset period by more than a preset threshold, but only if the ingress port packet rate is more than a preset minimum.

In a second example, back pressure from a host or high latency of host-NIC accesses (assuming the host communicates with the NIC through a Peripheral-Component Interconnect Express (PCIe) bus) is observed. The trigger evaluation data sources may be set to include:

1. Flow Control (FC) credits from a root complex (RC) of posted data requests.
2. FC credits from RC of non-posted requests data.
3. FC credits from RC of non-posted requests header.
4. PCIe tags.

The trigger evaluation rules may be set, for example:

1. To determine a trigger event when zero credits of any or all the trigger data sources (see above), during a preset period.
2. To determine a trigger event when the number of zero-credit occurrences, in any or all the trigger data sources, during a given period, exceeds the number of zero-credit occurrences in a previous preset period, by a preset amount (or percentage).

As would be appreciated, the structure of Network Device 100 and HDC 106 described above, and the method of flowchart 400 are cited by way of example. Network Devices, HDCs and methods in accordance with the disclosed techniques are not limited to the description hereinabove. In alternative embodiments, for example, the HDC may be distributed in the operational circuitry; HDC Data-Log Buffer 114 may be distributed, e.g., near the log-data sources. In some embodiments, trigger events may be chained, e.g., the HDC may be configured to detect a first trigger event, then a second trigger event (and sometimes more); the data to be logged before the first trigger event, between the first and second trigger events and after the second trigger event may be preset.

Processor 104 typically comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The configuration of network device 100, including HDC 106, and the method of flowchart 400 are example configurations and methods that are shown purely for the sake of conceptual clarity. Any other suitable configurations and flowcharts can be used in alternative embodiments.

Elements of HDC 106 may be implemented using suitable hardware, such as in one or more Application-Specific Integrated Circuits (ASICs) or Field-Programmable Gate Arrays (FPGAs), using software, using hardware, or using a combination of hardware and software elements.

Although the embodiments described herein mainly address network-device diagnostics, the methods and apparatuses described herein can also be used in other applications such as the debug and diagnosis of any digital devices. In one embodiment, an HDC is embedded in a network switch having multiple ingress ports and egress ports, and selection of a port for debugging (from among the ingress and egress ports) is based on a trigger and on data sources from the various ports.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
 operational circuitry; and
 Hardware Diagnostics Circuitry (HDC), configured to:
  receive a definition of multiple trigger rules, wherein each trigger rule specifies triggering of a respective trigger event as a function of one or more trigger data sources in the operational circuitry;
  receive a definition of (i) a pre-trigger logging set selected from among a plurality of diagnostics data sources in the operational circuitry, and (ii) for each trigger rule, a respective post-trigger logging set comprising a respective set of one or more of the diagnostics data sources; and
  during operation of the operational circuitry, repeatedly log the diagnostics data sources in the pre-trigger logging set while retaining only up to a defined amount of most-recent data from the diagnostics data sources in the pre-trigger logging set, repeatedly log the trigger data sources and repeatedly evaluate the trigger rules, and, in response to triggering of a given trigger event by a given trigger rule, start logging the diagnostics data sources in the post-trigger logging set of the given trigger rule.

2. The apparatus according to claim 1, wherein at least one post-trigger logging set is different from the pre-trigger logging set.

3. The apparatus according to claim 1, wherein the HDC is configured to log the diagnostics data sources in the post-trigger logging set over a defined time interval or up to a defined data size.

4. The apparatus according to claim 3, wherein the defined time interval or defined data size is specified per trigger rule.

5. The apparatus according to claim 1, wherein the HDC is configured to log images of the diagnostics data sources that are time-coherent relative to one another.

6. The apparatus according to claim 1, wherein at least one of the trigger rules specifies a condition to be met by the trigger data sources over a defined time interval.

7. The apparatus according to claim 1, wherein at least one of the trigger rules specifies a statistical condition to be met by the trigger data sources.

8. The apparatus according to claim 1, wherein the operational circuitry is configured to process communication packets, and wherein one or more of the trigger rules relate to performance of packet processing by the operational circuitry.

9. The apparatus according to claim 1, wherein the operational circuitry is configured to communicate over a bus, and wherein one or more of the trigger rules relate to performance of bus communication by the operational circuitry.

10. An apparatus, comprising:
 operational circuitry; and
 Hardware Diagnostics Circuitry (HDC), configured to:
  receive a definition of multiple trigger rules, wherein each trigger rule specifies triggering of a respective trigger event as a function of one or more trigger data sources in the operational circuitry;
  receive a definition of (i) a pre-trigger logging set selected from among a plurality of diagnostics data sources in the operational circuitry, and (ii) for each trigger rule, a respective post-trigger logging set comprising a respective set of one or more of the diagnostics data sources; and
  during operation of the operational circuitry:
   repeatedly log, in a memory, the diagnostics data sources in the pre-trigger logging set;
   repeatedly log the trigger data sources;
   repeatedly evaluate the trigger rules;
   in response to triggering of a given trigger event by a given trigger rule, start logging, in the memory, the diagnostics data sources in the post-trigger logging set of the given trigger rule; and
   responsively to a dump command, output at least part of the logged pre-trigger and post-trigger logging sets.

11. A method, comprising:
 in Hardware Diagnostics Circuitry (HDC) that is coupled to operational circuitry, receiving a definition of multiple trigger rules, wherein each trigger rule specifies triggering of a respective trigger event as a function of one or more trigger data sources in the operational circuitry;
 receiving in the HDC a definition of (i) a pre-trigger logging set selected from among a plurality of diagnostics data sources in the operational circuitry, and (ii) for each trigger rule, a respective post-trigger logging set comprising a respective set of one or more of the diagnostics data sources; and
 during operation of the operational circuitry, using the HDC, repeatedly logging the diagnostics data sources in the pre-trigger logging set while retaining only up to a defined amount of most-recent data from the diagnostics data sources in the pre-trigger logging set, repeatedly logging the trigger data sources and repeatedly evaluating the trigger rules, and, in response to triggering of a given trigger event by a given trigger rule, starting logging the diagnostics data sources in the post-trigger logging set of the given trigger rule.

12. The method according to claim 11, wherein at least one post-trigger logging set is different from the pre-trigger logging set.

13. The method according to claim 11, wherein logging the diagnostics data sources in the post-trigger logging set is performed over a defined time interval or up to a defined data size.

14. The method according to claim 13, wherein the defined time interval or defined data size is specified per trigger rule.

15. The method according to claim 11, wherein logging the diagnostics data sources comprises logging images of the diagnostics data sources that are time-coherent relative to one another.

16. The method according to claim 11, wherein at least one of the trigger rules specifies a condition to be met by the trigger data sources over a defined time interval.

17. The method according to claim 11, wherein at least one of the trigger rules specifies a statistical condition to be met by the trigger data sources.

18. The method according to claim 11, wherein one or more of the trigger rules relate to performance of processing of communication packets by the operational circuitry.

19. The method according to claim 11, wherein one or more of the trigger rules relate to performance of communication over a bus by the operational circuitry.

20. A method, comprising:
in Hardware Diagnostics Circuitry (HDC) that is coupled to operational circuitry, receiving a definition of multiple trigger rules, wherein each trigger rule specifies triggering of a respective trigger event as a function of one or more trigger data sources in the operational circuitry;
receiving in the HDC a definition of (i) a pre-trigger logging set selected from among a plurality of diagnostics data sources in the operational circuitry, and (ii) for each trigger rule, a respective post-trigger logging set comprising a respective set of one or more of the diagnostics data sources; and
during operation of the operational circuitry, using the HDC:
   repeatedly logging, in a memory, the diagnostics data sources in the pre-trigger logging set;
   repeatedly logging the trigger data sources;
   repeatedly evaluating the trigger rules;
   in response to triggering of a given trigger event by a given trigger rule, starting logging, in the memory, the diagnostics data sources in the post-trigger logging set of the given trigger rule; and
   responsively to a dump command, outputting at least part of the logged pre-trigger and post-trigger logging sets.

* * * * *